No. 891,380. PATENTED JUNE 23, 1908.
L. C. SHARP.
CAN BODY MAKING MACHINE.
APPLICATION FILED FEB. 11, 1907.
2 SHEETS—SHEET 1.
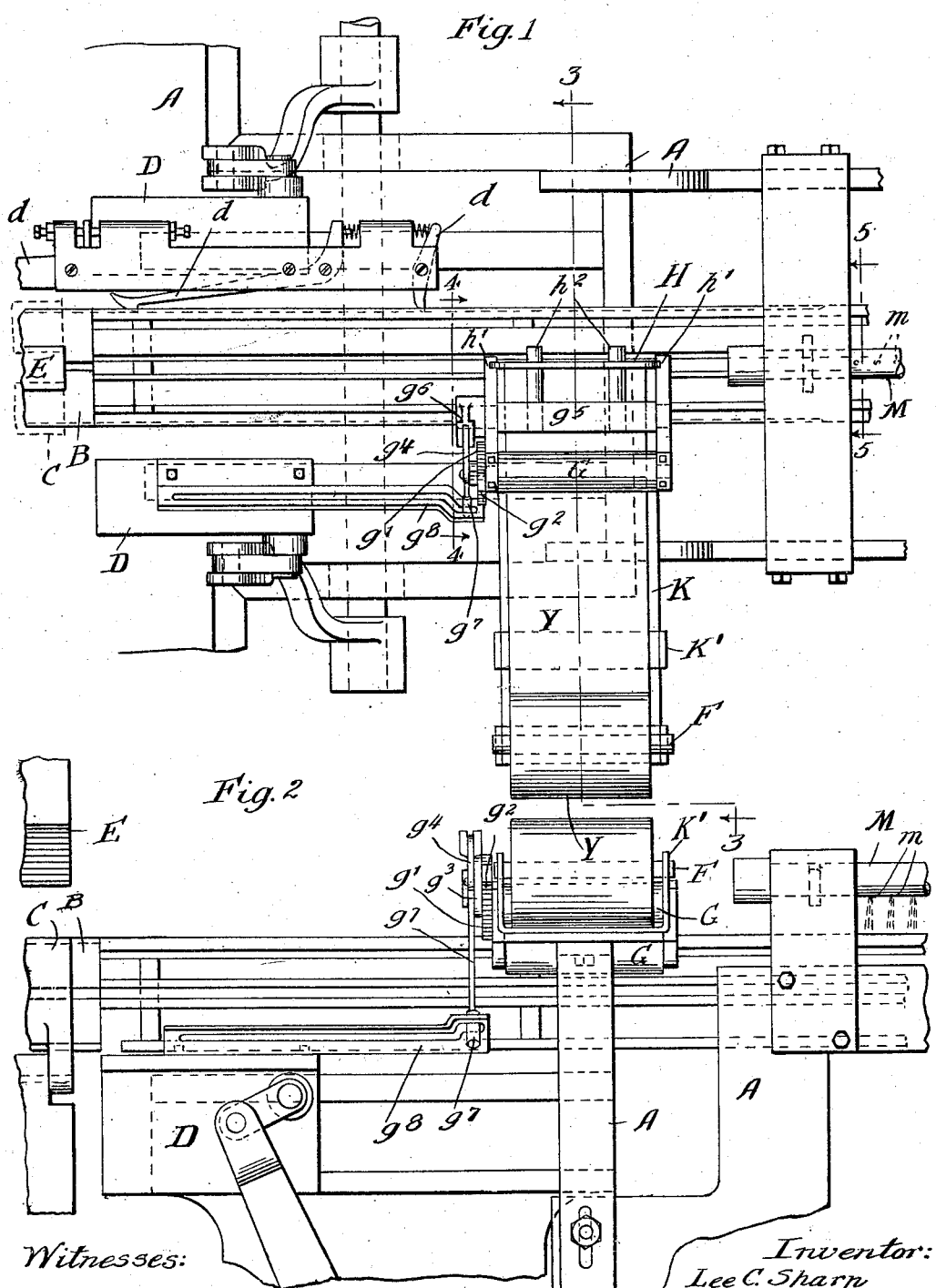
Witnesses:
Wm. Geiger
E. Adcock
Inventor:
Lee C. Sharp
by Munday, Evarts, Adcock
+ Clarke
Attorneys No. 891,380.  
PATENTED JUNE 23, 1908.  
L. C. SHARP.  
CAN BODY MAKING MACHINE.  
APPLICATION FILED FEB. 11, 1907.  
2 SHEETS—SHEET 2.
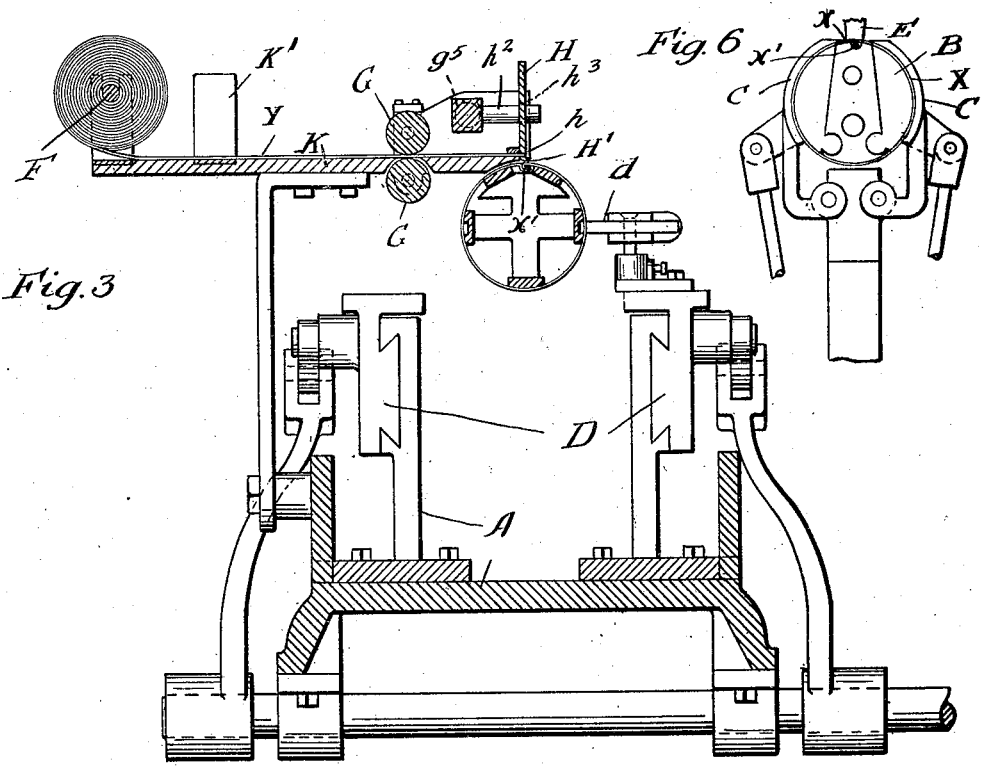
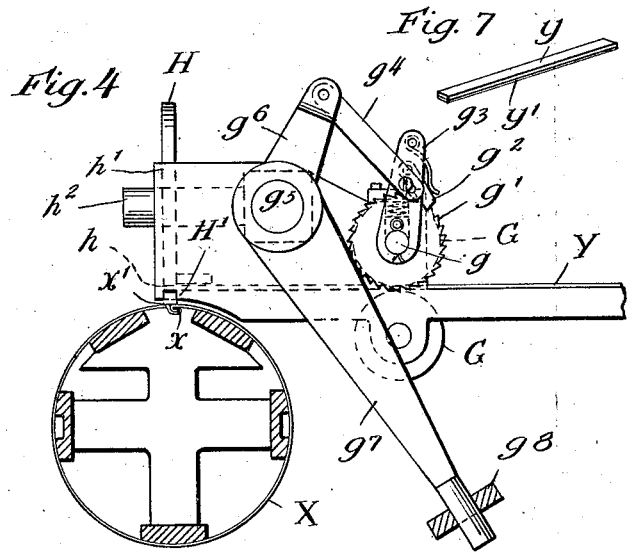
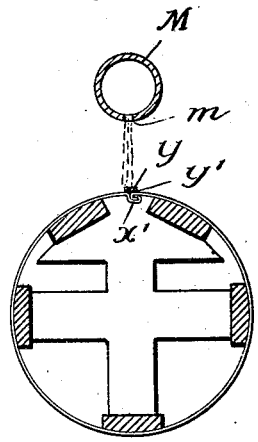
Witnesses:  
Wm. Geiger  
E. Adcock
Inventor:  
Lee C. Sharp  
by Munday Evarts, Adcock & Clarke Attorneys

UNITED STATES PATENT OFFICE.

LEE C. SHARP, OF PLATTSMOUTH, NEBRASKA, ASSIGNOR TO AMERICAN CAN COMPANY, OF NEW YORK, N. Y., A CORPORATION OF NEW JERSEY.

CAN-BODY-MAKING MACHINE.

No. 891,380.           Specification of Letters Patent.       Patented June 23, 1908.

Application filed February 11, 1907. Serial No. 356,710.

*To all whom it may concern:*

Be it known that I, LEE C. SHARP, a citizen of the United States, residing in Plattsmouth, in the county of Cass and State of Nebraska, have invented a new and useful Improvement in Can-Body-Making Machines, of which the following is a specification.

My invention relates to improvements in can body making machines, and more particularly to improvements in lock seam can body machines.

The object of my invention is to provide a lock seam can body machine of a simple, efficient and durable construction, by means of which rectangular can body blanks may be rapidly and cheaply formed into lock seam can bodies and the seams thereof efficiently and perfectly soldered with a minimum amount of solder.

My invention consists in the means I employ to practically accomplish this result, the same essentially comprising a horn around which the rectangular can body blank is folded or formed, folding wings for wrapping the blank around the horn, a bumper for compressing the interlocked hooks or edge folds of the blank into a folded or lock seam, a feeder for slipping or moving the can body along the horn, a ribbon solder spool, a ribbon solder feeder for feeding the ribbon solder forward at intervals, the same being coated on one side with a sticky or adherent flux so that the strip of the ribbon solder will adhere to the seam portion of the can body blank when pressed thereon, a ribbon solder cutter for cutting a narrow strip of solder from the ribbon and pressing it upon or against the seam portion of the can body and a fusing or soldering device, preferably a series of gas jets arranged above the horn, and under which the can body with the flux strip of thin sheet solder stuck thereon is passed, and by which the solder is fused and flowed into the seam.

My invention also consists in the novel construction of parts and devices, and in the novel combinations of parts and devices herein shown and described.

In the accompanying drawing forming a part of this specification, Figure 1 is a plan view of a lock seam can body making machine embodying my invention, the same showing only those parts of the can body forming mechanism to which my invention is applied and with which my devices co-operate. Fig. 2 is a side elevation. Fig. 3 is a vertical section on line 3—3 of Fig. 1. Fig. 4 is a detail vertical section on line 4—4 of Fig. 1; Fig. 5 is a detail vertical section on line 5—5 of Fig. 1; Fig. 6 is a detail elevation of the horn showing the folding wings and bumper of the body forming mechanism. Fig. 7 is a detail perspective view of a portion of the solder strip.

In said drawing, A represents the frame of the machine, B is the horn around which the can body blank X is wrapped by the folding wings C, and E the bumper by which the seaming flanges or meeting edges $x$ of the blank X are pressed together into a lock seam $x^1$, and D the can body feeder by which the can body blanks are slipped along the horn successively from the station where the meeting edges or hooks $x$ of the blank are formed to the station where the blank is wrapped around the horn and the seam bumped, and to the station where the blanks receive the fluxed solder strip $y$ as it is cut from the solder ribbon or sheet Y and finally past the fusing or soldering device. This feeder D preferably consists of a reciprocating slide furnished with a series of spring held hooks or pawls $d$, adapted to engage the can body blanks and move them along as required.

F is a spool or reel upon which the solder ribbon Y is wound, the same being in width equal to the length of the can body and from which it is intermittently fed by the solder ribbon feed device G to the solder strip cutter H. The solder ribbon or sheet Y is coated on one side with a sticky or adherent flux $y^1$ by which the solder strip cut from the ribbon is caused to firmly adhere to the seam portion of the can body blank $x$.

The solder ribbon feed device preferably consists of a pair of feed rolls G G, one above and one below the solder ribbon Y. One of these feed rolls G, preferably the upper one or its shaft $g$ is provided with a ratchet $g^1$, and is intermittently rotated by a pawl $g^2$ upon the pawl arm or lever $g^3$ through the connecting link $g^4$ and rock shaft $g^5$, having an arm $g^6$ connected to said link, and an arm $g^7$ engaged and operated by a cam $g^8$ on the slide D and which is connected to and timed with moving devices of the lock seam can body forming mechanism. A guide K having upright wings $K^1$ for the solder ribbon extends from the spool F to the feed rolls G G and from the feed rolls G G to the horn B and to the solder cutter H $H^1$.

The lower or stationary solder cutter $H^1$ is arranged directly over the horn and slightly to one side of the seam or portion of the can body blank upon which the narrow solder strip $y$, cut from the solder ribbon Y is to be pressed by the upper or reciprocating cutter H. The cutter H preferably has a substantially flat or square lower face $h$, so that the same device will operate to cut the narrow solder strip $y$ from the solder ribbon Y, and also to press such narrow solder strip $y$ firmly upon the seam of the can body blank and cause the same to properly adhere thereto by the sticky flux on the under side of the solder strip. The movable or reciprocating solder cutter H is preferably intermittently operated as required in its upright guides $h^1$, by means of vibrating arms $h^2$ on the rock shaft $g^5$ by which the solder feeder is operated. These vibrating arms $h^2$ extend through slots or openings $h^3$ in the reciprocating knife or cutter H.

The fusing or soldering device M by action of which the fluxed solder strip stuck upon the seam portion of the can body blank is fused and the solder flowed into the seam, consists preferably of a gas pipe arranged directly above the horn B, and provided with a series of burner orifices or jets $m$ arranged in line with the horn B and with the seam of the can body to be soldered.

I claim:

1. In a lock seam can body making machine, the combination with the horn, folder wings and bumper, of a sheet solder ribbon spool, an intermittently operated solder ribbon feeder, a solder strip cutter for severing a narrow strip from a sticky flux coated ribbon or sheet of solder and pressing and sticking it upon the seam portion of the can body blank, and a fusing or soldering device arranged above the horn for fusing the adherent solder strip, substantially as specified.

2. In a lock seam can body making machine, the combination with the horn, folder wings and bumper, of a sheet solder ribbon spool, an intermittently operated solder ribbon feeder, a solder strip cutter for severing a narrow strip from a sticky flux coated ribbon or sheet of solder and pressing and sticking it upon the seam portion of the can body blank, a fusing or soldering device arranged above the horn for fusing the adherent solder strip and a reciprocating feeder for the can body blanks, substantially as specified.

3. In a lock seam can body forming and soldering machine, the combination with the horn folding wings and bumper, of a spool for a sticky flux coated solder ribbon, a feeder for the solder ribbon, a cutter for severing a narrow strip of solder from said ribbon and pressing it upon the seam portion of the can body and a fusing or soldering device, substantially as specified.

4. In a lock seam can body making machine in combination with a lock seam can body former horn, folding wings and bumper, of a solder ribbon spool, a solder ribbon feeder and cutter for severing a narrow strip from the solder ribbon and pressing it upon the seam portion of the can body and a fusing or soldering device, substantially as specified.

5. In a lock seam can body making machine, the combination with a horn, a fusing or soldering device above the horn, a solder ribbon spool, a solder ribbon feeder and a solder ribbon cutter arranged above the horn for severing a narrow strip of solder from the ribbon and pressing it upon the seam of the can body, substantially as specified.

6. In a can body making machine, the combination with a horn, of a fusing or soldering device above the horn, folding wings for wrapping the blank around the horn, a solder ribbon spool, a solder ribbon feeder and a solder ribbon cutter arranged above the horn for severing a narrow strip of solder from the ribbon and pressing it upon the seam of the can body, substantially as specified.

7. In a lock seam can body making machine, the combination with a horn, folding wings for wrapping the blank around the horn, a bumper, a solder ribbon feeder and a solder ribbon cutter, said cutter operating to press the solder ribbon against the seam, substantially as specified.

8. In a lock seam can body making machine, the combination with a horn, folding wings and bumper, of a feeder for sticky flux coated solder ribbon and a cutter for severing a narrow strip from the solder ribbon, and pressing it upon the seam of the can body, substantially as specified.

9. In a lock seam can body making machine, the combination with a horn, folding wings and bumper, of a feeder for sticky flux coated solder ribbon and a cutter for severing a narrow strip from the solder ribbon, and pressing it upon the seam of the can body, and a soldering or fusing device, substantially as specified.

10. In a lock seam can body making machine, the combination with a horn, folding wings and bumper, of a feeder for sticky fluid coated solder ribbon and a cutter for severing a narrow strip from the solder ribbon, and pressing it upon the seam of the can body, a soldering or fusing device and a feeder for advancing the can bodies along the horn, substantially as specified.

11. In a can body making machine, the combination with a horn, of folding wings for wrapping the blank around the horn, a fusing or soldering device above the horn, a feeder for sticky flux coated solder ribbon and a cutter for severing a narrow strip from the solder ribbon and pressing it upon the seam of the can body, and a feeder for advancing the can bodies along the horn, substantially as specified.

LEE C. SHARP.

Witnesses:
EDMUND ADCOCK,
PEARL ABRAMS.